United States Patent
Sabo

(10) Patent No.: US 8,925,202 B2
(45) Date of Patent: Jan. 6, 2015

(54) METHOD FOR MANUFACTURING A TOOTHED DISC

(71) Applicant: Magna Powertrain Inc., Concord (CA)

(72) Inventor: John Sabo, Ontario (CA)

(73) Assignee: Magna Powertrain Inc., Concord (CA)

( * ) Notice: Subject to any disclaimer, the term of this patent is extended or adjusted under 35 U.S.C. 154(b) by 0 days.

(21) Appl. No.: 14/100,730

(22) Filed: Dec. 9, 2013

(65) Prior Publication Data

US 2014/0157928 A1     Jun. 12, 2014

Related U.S. Application Data

(63) Continuation of application No. 12/531,509, filed as application No. PCT/CA2008/000557 on Mar. 19, 2008, now Pat. No. 8,601,893.

(60) Provisional application No. 60/895,514, filed on Mar. 19, 2007.

(51) Int. Cl.
```
B21K 1/30      (2006.01)
F16H 55/17     (2006.01)
B21H 1/02      (2006.01)
B21H 5/02      (2006.01)
B21H 7/18      (2006.01)
```
(52) U.S. Cl.
CPC .............. *F16H 55/17* (2013.01); *B21H 1/02* (2013.01); *B21H 5/02* (2013.01); *B21H 7/187* (2013.01)
USPC .......... 29/893.2; 29/893.3; 29/893.36; 29/893

(58) Field of Classification Search
CPC ............ B21H 1/02; B21H 5/02; B21H 7/187; F16H 55/17
USPC .......... 29/893, 893.3, 893.32, 893.36, 893.37; 72/110, 102, 107, 125, 370.19, 370.2
See application file for complete search history.

(56) References Cited

U.S. PATENT DOCUMENTS

| | | |
|---|---|---|
| 1,001,799 A | 8/1911 | Anderson |
| 1,580,975 A | 4/1926 | Retterath |
| 2,367,226 A | 1/1945 | Lonsdale |
| 2,371,697 A | 3/1945 | Logan |
| 2,886,990 A | 5/1959 | Bregi |
| 3,261,192 A * | 7/1966 | Saito et al. ................. 72/87 |
| 3,273,366 A | 9/1966 | Schuman |
| 3,953,996 A | 5/1976 | Chernock |
| 4,945,783 A | 8/1990 | Grob |

(Continued)

FOREIGN PATENT DOCUMENTS

WO     WO-8705651 A     9/1987

*Primary Examiner* — Sarang Afzali
(74) *Attorney, Agent, or Firm* — Dickinson Wright PLLC

(57) ABSTRACT

A novel method of manufacturing a toothed disc is taught wherein the teeth can be cold formed to a relatively high set of tolerances in a relatively time-efficient manner. A cold-formed disc blank with an annular thickened ring about its periphery is forced through a set of tooth forming rollers which engage the annular thickened ring. As the blank is forced through the set of rollers, the rollers cold forming tooth structures in the annular ring. In some circumstances, the tooth structure can be a final desired tooth profile and in other circumstances, the disc blank may be forced through two or more different sets of tooth forming rollers, each set of tooth forming rollers contributing to the forming of the final, desired tooth profile.

9 Claims, 3 Drawing Sheets

(56) References Cited

U.S. PATENT DOCUMENTS

| | | | |
|---|---|---|---|
| 5,152,061 A * | 10/1992 | Himmeroeder | 29/893.32 |
| 5,203,223 A * | 4/1993 | Himmeroeder | 74/449 |
| 5,237,744 A * | 8/1993 | Himmeroeder | 29/893.32 |
| 5,237,745 A | 8/1993 | Yamanaka | |
| 5,404,640 A * | 4/1995 | Himmeroeder | 29/893.32 |
| 5,562,785 A | 10/1996 | Yamanaka | |
| 5,592,848 A | 1/1997 | Bodnar | |
| 5,722,138 A | 3/1998 | Yamanaka | |
| 5,737,955 A | 4/1998 | Ohya et al. | |
| 5,774,986 A | 7/1998 | Nishimura et al. | |
| 5,878,493 A | 3/1999 | Himmeroeder | |
| 5,918,495 A | 7/1999 | Miyamoto et al. | |
| 5,930,896 A | 8/1999 | Akiyoshi et al. | |
| 6,089,065 A | 7/2000 | Deriaz | |
| 6,161,409 A | 12/2000 | Friese | |
| 6,279,366 B1 | 8/2001 | Sakaguchi | |
| 6,330,836 B1 | 12/2001 | Watanabe et al. | |
| 6,470,724 B1 | 10/2002 | Friese | |

* cited by examiner

METHOD FOR MANUFACTURING A TOOTHED DISC

CROSS-REFERENCE TO RELATED APPLICATIONS

This application is a continuation of U.S. application Ser. No. 12/531,509 filed Sep. 16, 2009, now U.S. Pat. No. 8,601,693, which is a national stage entry of PCT/CA08/00557, field Mar. 19, 2008, which claims priority to U.S. Provisional Patent Application No. 60/895,514, filed Mar. 19, 2007. The disclosures of the above applications are incorporated herein by reference.

FIELD OF THE INVENTION

The present invention relates to a method of manufacturing a toothed disc and the toothed disc produced by the method. More specifically, the present invention relates to a method of cold forming a disc with a set of radially extending gear teeth about the periphery of the disc and the disc formed thereby.

BACKGROUND OF THE INVENTION

It is well known to form a toothed disc by cold forming the disc from a steel blank and then forming the desired teeth thereon. Such discs can be used for a variety of purposes, such as flex plates for internal combustion engines, etc. In the specific case of flex plates, the teeth formed on the periphery of the disc are engaged by the engine's starter motor to rotate the crankshaft of the engine to start the engine.

For example, U.S. Pat. Nos. 5,152,061; 5,203,223; 5,237,744; and 5,404,640 to Himmeroeder, which are assigned to the assignee of the present invention and the contents of each of which patents are incorporated by reference herein, disclose methods of cold forming a toothed disc from a steel blank. In the first three Himmeroeder patents mentioned above, an annular thickened ring is cold formed about the periphery of the disc and a tooth forming device, in the form of a gear, engages this thickened ring and is synchronously rotated about the periphery of the disc to press-form the desired teeth into the thickened ring to finish the disc.

While the methods taught in the first three above-mentioned patents to Himmeroeder have been commercially successful, when the teeth are formed solely by cold press forming, it has proven difficult to achieve tight tolerances in the shape of the teeth. In U.S. Pat. No. 5,404,640, Himmeroeder discloses that to achieve tighter tolerances, the forming of the teeth can be completed with a hobbing operation which removes undesired material accumulated in the teeth during the cold press-forming operations.

Further, the need in the Himmeroeder methods to rotate the cold formed disc with a tooth forming device and, in some cases, to perform subsequently hobbing on the teeth requires a significant amount of time to complete the manufacture of the disc and incurs a corresponding manufacturing expense.

U.S. Pat. No. 5,878,493, also to Himmeroeder and assigned to the assignee of the present invention and the contents of which are also incorporated by reference herein, discloses a method of cold forming a disc with an annular thickened ring and then forming the desired teeth about the thickened ring by indexed rotation of the disc and a hobbing operation to completely form each tooth. While the disclosed method provides for the formation of the teeth with very tight tolerances, the manufacturing time required to form each tooth by hobbing is significant, again resulting in a relatively high manufacturing cost.

SUMMARY OF THE INVENTION

It is desired to have a method of manufacturing a toothed disc which allows for tight tolerances on the formation of the teeth while also reducing the cost and/or time of manufacture. It is an object of the present invention to provide a novel method of manufacturing a toothed disc, and the toothed disc produced from the method, which obviates or mitigates at least one disadvantage of the prior art.

According to a first aspect of the present invention, there is provided a method of cold forming a toothed disc, comprising the steps of: stamping a disc blank from a feed-stock; cold forming an annular thickened ring about the periphery of the disc blank; and forcing the disc blank through a set of tooth forming rollers which engage the annular thickened ring to cold form a set of tooth structures about the annular thickened ring.

The present invention provides a novel method of manufacturing a toothed disc wherein the teeth can be cold formed to a relatively high set of tolerances in a relatively time-efficient manner. A cold-formed disc blank with an annular thickened ring about its periphery is forced through a set of tooth forming rollers which engage the annular thickened ring. As the blank is forced through the set of rollers, the rollers cold-forming tooth structures in the annular ring. In some circumstances, the tooth structure can be a final desired tooth profile and in other circumstances, the disc blank may be forced through two or more different sets of tooth forming rollers, each set of tooth forming rollers contributing to the forming of the final, desired tooth profile.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

A method of manufacturing a toothed disc, in accordance with the present invention, commences with the forming of a suitable disc blank with an annular thickened ring upon which the desired teeth can subsequently be formed. Any suitable method of forming the disc blank can be employed, such as the cold forming methods illustrated in the above-mentioned patents to Himmeroeder or by any other suitable method, as will occur to those of skill in the art.

Once a suitable disc blank has been formed, the method continues with at least one, and preferably two or more, tooth forming operations being performed on the thickened annular ring of the disc blank.

Figure 1:
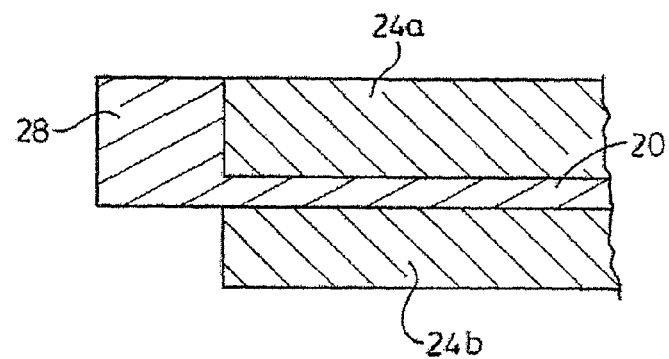
FIG. 1 shows a cross section through a portion of a cold-formed disc blank used in the present invention.

Specifically, as shown in FIG. 1, a tooth forming operation commences with the web portion 20 of the disc blank being loaded into held a two-part carrier 24a, 24b that abuts the upper and lower surfaces of web portion 20 inside the thickened annular ring 28 of the disc blank, exposing the annular ring.

Figure 2:
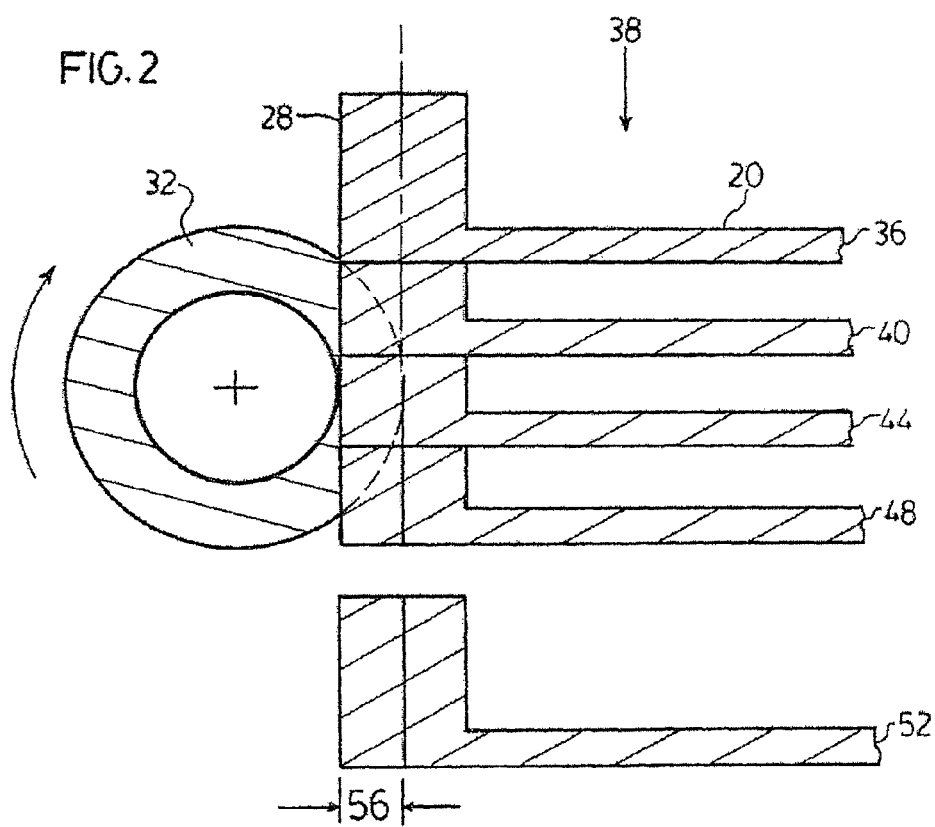
FIG. 2 shows a cross section of the portion of the disc blank of FIG. 1 being moved past a tooth-forming roller in accordance with the present invention.

The formed disc blank in carrier 24 is then moved through a set of tooth forming rollers 32 which engage the outer periphery of thickened annular ring 28 and cold form radially extending teeth therein. In the first preferred embodiment, the number of rollers 32 corresponds to the number of desired teeth to be formed in the final toothed disc. Each roller has an axis of rotation that is radially tangential to the axial direction as indicated by arrow 38. In other words, the axis of rotation of each of the rollers 32 is preferably orthogonal to the axis of rotation of the disc blank. As shown in FIG. 2, the disc blank (the carrier has been omitted from this Figure for clarity) is first in an initial position, indicated at 36, wherein thickened annular ring 28 does not contact tooth-forming roller 32.

Next, the disc blank and the carrier 24 is driven to move axially from initial position 36, in the direction indicated by arrow 38, in the direction of the axis of rotation of the disc blank, through intermediate positions indicated at 40, 44, and 48, wherein each tooth-forming roller 32 traverses thickened annular ring 28 to cold form simultaneously a series of teeth in thickened annular ring 28.

The tooth forming operation completes when the disc blank reaches a final position, indicated at 52, wherein thickened annular ring 28 has completely traversed each tooth forming roller 32 and teeth, of depth 56, have been formed in ring 28 simultaneously by each tooth forming roller 32.

Figure 3:
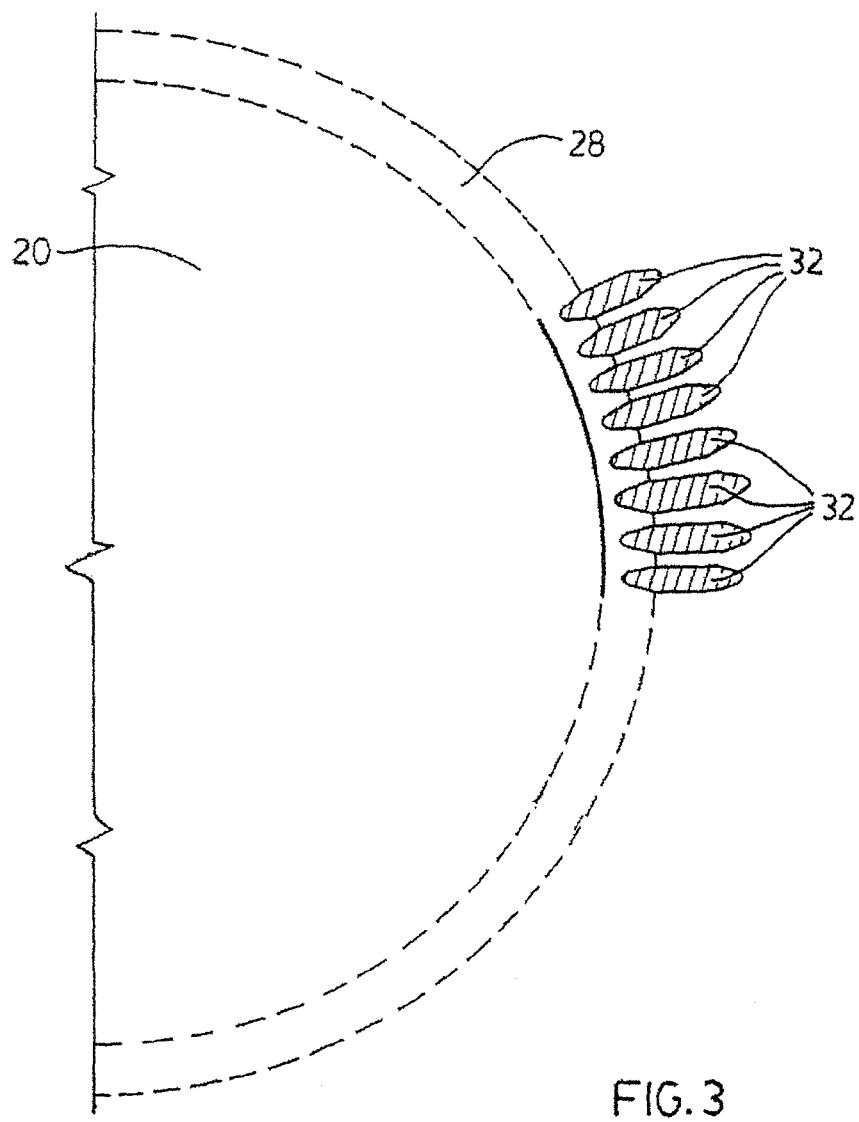
FIG. 3 a top view of a portion of the disc blank of FIG. 2 being moved past a set of tooth forming rollers.

A separate tooth-forming roller 32 is used to form each tooth on annular ring 28. FIG. 3 shows one arrangement of tooth forming rollers 32 about the periphery of the disc.

As will be apparent to those of skill in the art, depending upon the desired shape, depth and/or spacing of the teeth to be formed in annular ring 28, it may be required or preferred to form the final teeth in two or more tooth forming operations. For example, if the teeth to be formed are relatively closely spaced, it may be difficult to arrange tooth-forming rollers 32 in the desired/required spacing about the periphery of the disc. In such a case, it is contemplated that an arrangement can be employed of tooth forming rollers 32 to form every second tooth and a first tooth forming operation can be performed to form a first half number of the desired teeth, after which a second tooth forming operation can be performed to form the remaining half of the desired teeth. This second tooth fanning operation can be performed by, for example, rotating the disc and carrier 24 by one tooth-width after the first tooth forming operation has completed and again moving the disc blank through the set of tooth forming rollers 32 to form the missing teeth. Alternatively, the disc blank with one half or the desired teeth can be moved to a second forming station wherein the disc blank is loaded into a second carrier 24, in an indexed manner to assure its rotational orientation, and then the disc blank can be moved through a second set of tooth forming rollers 32 which are positioned to form the missing teeth.

It is also contemplated that, depending upon the properties of the material from which the disc is formed, and the desired depth of the teeth and the desired shape of the teeth, it may be difficult or impractical to form the teeth with a single tooth forming operation. In such a case, the first tooth forming operation may employ a set of tooth forming rollers 32 with a profile that is suitable for a first forming operation and a second tooth forming operation can be performed with a set of tooth forming rollers 32 which have the desired final profile, the second set of tooth forming rollers being moved through, and finishing, the structures formed in annular ring 28 by the first set of tooth forming rollers 32.

It is contemplated that the first and second tooth forming operations can be performed in any suitable manner, such as at two separate forming stations, with the disc blank being appropriately indexed to assure alignment of the second set of tooth forming rollers 32 with the preliminary structures formed by the first set of tooth forming rollers 32, or at a single forming station wherein the disc blank is moved through both the first set of tooth forming rollers 32 and then through the second set of tooth forming rollers 32 to complete the formation of the teeth.

If required, or desired, three or more tooth forming operations can be performed, either forming the final tooth profiles in incremental steps with sets of tooth forming rollers 32 having different profiles, or forming subsets of the total number of teeth to permit the location and arrangement of tooth forming rollers 32 about the periphery of the disc blank or in a combination of both types of operation.

If desired, once the final tooth forming operation has been performed and the formed teeth have the desired profile, the teeth can hardened by heat treating, or any other suitable hardening process as will occur to those of skill in the art. However, it is contemplated that, in many circumstances, no further treatment will be required once the final profile has been formed.

Figure 4:
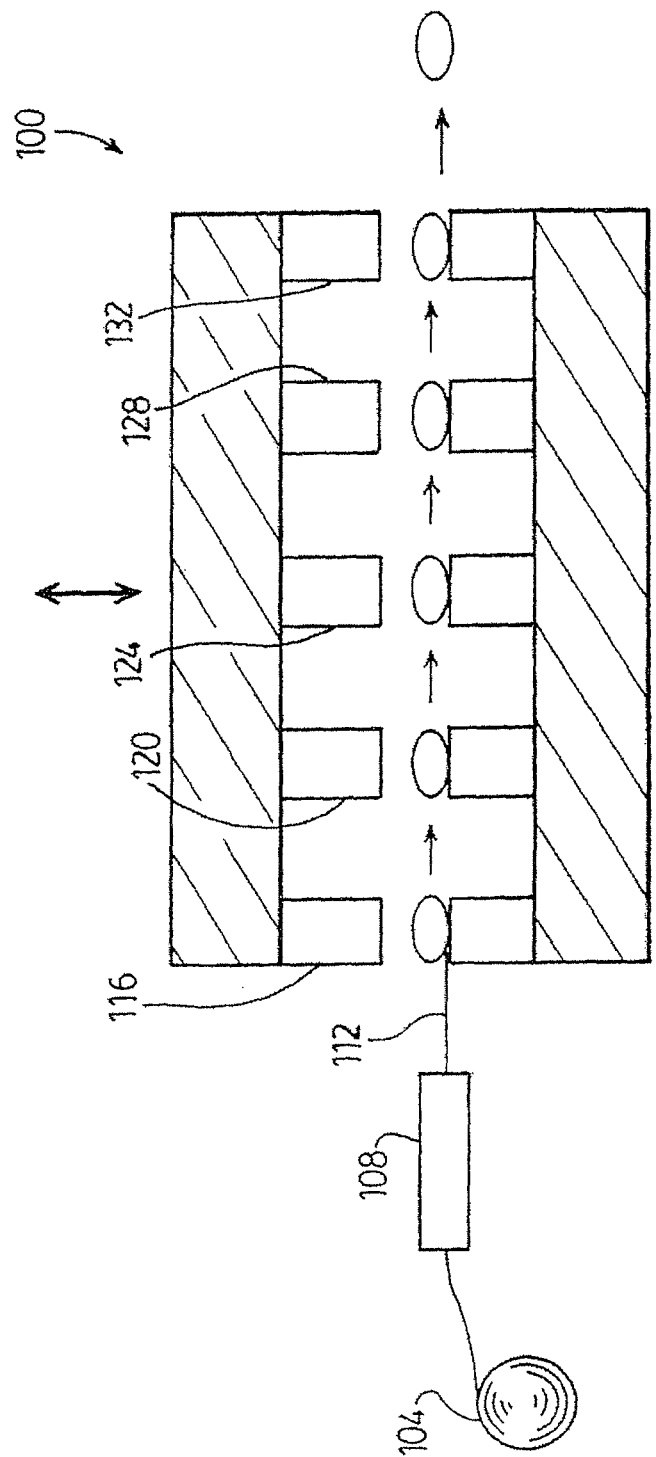
FIG. 4 shows a schematic representation of a multi-stage press which can be employed with the method of the present invention.

FIG. 4 shows a schematic representation of a multi-station press 100 which can be used to implement the method of the present invention. Specifically, a coil 104 of steel is supplied to a feeder 108 which supplies a suitable feed of steel feedstock 112 during one cycle of press 100 wherein a disc blank is stamped from the steel feedstock 112 during one cycle of press 100. This stamping operation can form the circular disc, as well as remove undesired material from the center area of the disc and any weight saving areas.

As press 100 opens during the next cycle, the disc blank is moved to the second station 120 which can perform one or more of the steps required to cold form the thickened annular ring 28 of the disc. As press 100 opens during the next cycle, the disc blank is moved to the third station 124 which performs one or more steps required to complete the cold forming of the disc blank with the thickened annular ring 28.

As press 100 opens during the next cycle, the finished disc blank is moved to the fourth station 128 wherein a first tooth forming process is performed with a first set of tooth forming rollers.

Again, as press 100 opens during the next cycle, the disc blank with the partially formed set of teeth is moved to the fifth station 132 wherein a second tooth forming process is performed with a second set of tooth forming rollers. As press 100 opens during the next cycle, the now finished toothed disc is removed from press 100 and can be further treated, if desired, to harden the finished teeth, etc.

In the illustrated embodiment, each of the two tooth forming processes are performed at a separate station, in this case stations 128 and 132. However, as is also mentioned above, it is also contemplated that, in some circumstances, more than one set of tooth forming rollers 32 can be provided at a single station. For example, if station 128 is equipped with two sets of tooth forming rollers 32 which are spaced apart (in the direction of the stroke of press 100) from one another. In such a case, as press 100 cycles the disc blank is then forced through first one set of tooth forming rollers 32 and then through the second set of tooth forming rollers 32. It is contemplated that, in at least some circumstances, depending upon the useful stroke length of press 100, two or more tooth forming operations can be performed in this manner at a single station.

As will be apparent to those of skill in the art, it is expected that the toothed discs produced with the method of the present invention can be produced in a continuous fashion, with disc blanks being appropriately processed simultaneously at each station of press 100 before being moved to the next station or being completed. As will also be apparent to those of skill in the art, the present invention is not limited to use with a five-station press and fewer or more stations can be employed as necessary, depending upon the design of, and requirements for, the finished toothed disc. Nor is the present invention limited to the use of a multi-station press and separate devices and/or machines can be employed for one or more of the stages of the process if desired.

It is also contemplated that additional manufacturing operations can be performed at appropriate points during the manufacturing process. For example, the disc blank can be heat treated to harden it once annular thickened ring 28 has been formed. Or, thickened annular ring 28 can be heat treated before the disc blank is forced through tooth forming rollers 32, or after being forced through one set of tooth forming rollers 32 and before being forced through the next set of tooth forming rollers 32, etc. It is also contemplated that the disc blank can be subjected to piercing operations to remove undesired material and/or to other machining operations to form threaded bores, etc., as desired.

Depending upon the required strength for the formed toothed disc, it is presently contemplated that a work hardening steel, such as TRIP steel, may be preferred as the feedstock material. It is further contemplated that the temperature of the work hardening steel can be raised, during the manufacturing processes, as needed to permit the forming of the teeth with tooth forming rollers 32.

The present invention provides a novel method of manufacturing a toothed disc wherein the teeth can be cold formed to a relatively high set of tolerances in a relatively time-efficient manner. A cold-formed disc blank with an annular thickened ring about its periphery is forced through a set of tooth forming rollers which engage the annular thickened ring. As the blank is forced through the set of rollers, the rollers cold forming tooth structures in the annular ring. In some circumstances, the tooth structure can be a final desired tooth profile and in other circumstances, the disc blank may be forced through two or more different sets of tooth forming rollers, each set of tooth forming rollers contributing to the forming of the final, desired tooth profile.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A method of forming a toothed disc, comprising the steps of:
providing a disc blank disposed about a disc axis; and
forming a plurality of teeth simultaneously along a periphery of the disc blank;
the forming step including engaging the periphery of the disc blank with a plurality of tooth forming rollers simultaneously, and the tooth forming rollers each rotating about a respective axis which is not parallel to the disc axis.

2. The method of claim 1 wherein the plurality of tooth forming rollers is a first set of tooth forming rollers, and the method further comprises the step of engaging the periphery of the disc blank with a second set of tooth forming rollers after the first set.

3. The method of claim 2 wherein each of the tooth forming rollers in the first set have a first tooth profile, each of the tooth forming rollers in the second set have a second tooth profile different from the first tooth profile, and the second set of tooth forming rollers engage the teeth formed by the first set of tooth forming rollers to modify the profile of the teeth.

4. The method of claim 2 wherein the first set of tooth forming rollers form a first set of teeth, and the second set of tooth forming rollers form a second set of teeth offset from the first set of teeth.

5. The method of claim 1 wherein a separate one of the tooth forming rollers is used to form each tooth of the disc blank.

6. The method of claim 1 wherein the step of forming the plurality of teeth includes moving the disc blank in an axial direction through the plurality of tooth forming rollers, each tooth forming roller individually rotating about the respective axis disposed tangential to the disc axis of the disc blank to transversely engage the periphery of the disc blank with each of the tooth forming rollers.

7. The method of claim 1 wherein the forming step comprises cold forming.

8. The method of claim 1 wherein each of the tooth forming rollers has a tooth forming profile corresponding to a desired tooth profile and the teeth formed in the disc blank have the desired tooth profile.

9. The method of claim 1 wherein the disc blank includes a thickened annular ring along the periphery, and the teeth are formed in the thickened annular ring.

* * * * *